Patented June 24, 1947

2,423,062

UNITED STATES PATENT OFFICE 2,423,062

RESOLUTION OF α-HYDROXY-β:β-DIMETHYL-γ-BUTYROLACTONE

Franz Bergel, Aaron Cohen, Alexander Lang Morrison, and Albert Ronald Moss, Welwyn Garden City, England, assignors, by mesne assignments, to Hoffmann-La Roche Inc., Nutley, N. J., a corporation of New Jersey No Drawing. Application September 30, 1944, Serial No. 556,656. In Great Britain October 1, 1943

11 Claims. (Cl. 260—344)

This invention relates to a process for the resolution of α-hydroxy-β:β-dimethyl-γ-butyrolactone.

d(—) - α - Hydroxy-β:β-dimethyl-γ-butyrolactone required for the synthesis of d(+)-pantothenic acid has been obtained by resolution of the dl-lactone in a number of different ways. The processes in the scientific literature employ alkaloids or alkaloid derivatives, i. e., quinine; and quinine, cinchonine or quinidine methyl hydroxides. These processes fall into two classes; those in which the lactone ring is opened by action of the alkaloid (Reichstein and Grüssner, Helv. Chim. Asta, 1940, 23, 650); or alkaloid methyl hydroxide (Major and Finkelstein, J. A. C. S., 1941, 63, 1368) and the mixture of salts of the d(+)— and l(—)-butyric acids are separated by fractional crystallization; and those in which the lactone ring is opened with sodium or barium hydroxides and the solutions of sodium or barium α:γ-dihydroxy-β:β-dimethyl butyrates reacted with the alkaloids in such a manner that the alkaloid salt of the desired enantiomorph crystallizes substantially free from the salt of the other enantiomorph (Stiller et al., J. A. C. S., 1940, 62, 1785, and British specification No. 552,705).

Furthermore, in U. S. Patent No. 2,328,000 in which the preparation of alkaloid salts of the hydrogen phthalate of α-hydroxy-β:β-dimethyl-γ-butyrolactone is described, it is stated that such salts are useful for the resolution of the racemic lactone into its optically active isomers.

We have now found according to this invention that dl-α-hydroxide-β:β-dimethyl-γ-butyrolactone reacts with chlorsulphonic acid so as to produce the corresponding dl-lactone hydrogen sulphate; and that this compound forms, with strychnine and brucine, salts having physical properties which enable a resolution of the hydrogen sulphate to be very conveniently performed. Accordingly the present invention provides a process for the resolution of dl-α-hydroxy-β:β-dimethyl-γ-butyrolactone which comprises treating dl-α - hydroxy-β:β-dimethyl-γ-butyrolactone with chlorsulphonic acid to produce the hydrogen sulphate of the said dl-lactone, reacting this compound with strychnine or brucine to form the corresponding strychnine lactone sulphates or the brucine lactone sulphates, crystallizing and separating strychnine d(—)-α - hydroxy - β:β-dimethyl-γ-butyrolactone sulphate or brucine d(—)-α-hydroxy-β:β-dimethyl-γ-hydrogen sulphate, and hydrolysing the optically active salt thus obtained to obtain d(—)-α-hydroxy-β:β-dimethyl-γ-butyrolactone.

The process may be carried out in such a way that the strychnine or brucine salts of the d(—)-lactone hydrogen sulphate are obtained in a pure state without having recourse to fractional crystallization. On treatment with dilute mineral acid the brucine or strychnine salts dissolve and on heating the solution the sulphate residue is hydrolyzed quantitatively from the d(—)-lactone. This d(—)-lactone may be obtained, after removal of the crystallized alkaloid mineral acid salt by filtration, by extraction with an appropriate solvent. For this process benzene was found to be one of the most suitable solvents since it provides a water-free extract. Thus the lactone ring remains intact during the whole process, never opening so as to form the α:γ-dihydroxy-β:β-dimethyl-butyric acid. This constitutes a distinct improvement over other methods, since as a result the crude d(—)-lactone contains significantly less of the l(+)-isomer than the corresponding material obtained in these other processes. In consequence less manipulative procedure is required in order to obtain pure d(—) - α - hydroxy-β:β-dimethyl-γ-butyrolactone and the final yields are correspondingly higher. Traces of alkaloid mineral acid salt contaminating the d(—)-lactone may readily be removed by stirring an anhydrous solution (e. g. a benzene solution) with adsorbent charcoal or by distillation of the d(—)-lactone in vacuo.

The process of the present invention presents, for example, the following advantages over the resolution via the hydrogen phthalate or other half-esters of organic dibasic acids:

(i) The formation of the hydrogen sulphate occurs in better yield and without the presence of the expensive pyridine needed for the hydrogen phthalate. In addition the crude reaction product may be used for the resolution without troublesome purification.

(ii) In the resolution procedure, safety of working is increased by working in aqueous solution instead of the acetone required in the hydrogen phthalate method.

(iii) In contrast to the hydrogen phthalate linkage the hydrogen sulphate linkage is readily split in acid solution. Thus the lactone ring is never opened and the overall yield of the d(—)-lactone is considerably higher than that obtainable by the resolution process requiring the formation of the hydrogen phthalate or similar methods.

The strychnine d(—)-lactone sulphate may be decomposed with alkali, but as this treatment involves opening the lactone ring, the further action of acid to achieve relactonization and to hydrolyze away the sulphate residue does not yield d(−)-α-hydroxy-β:β-dimethyl-γ-butyrolactone in as pure a state as by the acid decomposition method.

If desired the l(+)-α-hydroxy-β:β-dimethyl-γ-butyrolactone may be obtained after a mineral acid hydrolysis of the mother liquors from which the alkaloid d(−)-lactone sulphate has separated.

The following examples illustrate how the process may be carried into effect. All quantities are given in parts by weight.

*Example 1*

130 parts of dl-α-hydroxy-β:β-dimethyl-γ-butyrolactone are dissolved in 156 parts of carbon tetrachloride and 84.5 parts of dry pyridine. This solution is mechanically stirred under anhydrous conditions and cooled in ice. To the cold mixture is added slowly from a dropping funnel 126 parts of chlorsulphonic acid dissolved in 97 parts of chloroform and 52 parts of carbon tetrachloride. When addition of this mixture is complete the reaction mixture is allowed to warm up to room temperature, stirring being continued for 2 hours. It remains thus, protected from the moisture of the atmosphere by a calcium chloride tube, for 24 hours. At the end of this period the solvents are removed by warming under water pump vacuum and the crystalline residue is dissolved in 650 parts of water. This solution is cooled in ice, mechanically stirred and neutralized with sodium hydroxide until the pH reaches 6.5–7.0. This procedure requires about 60 parts of sodium hydroxide which is dissolved in about 400 parts of water. To the solution is added 203 parts of strychnine hydrochloride dissolved in 2000 parts of water. Crystallization of the strychnine d(−)-lactone sulphate commences almost immediately and is allowed to continue at 0° to +5° C. for 36 hours.

The crystalline salt is filtered off, washed with 600 parts of water in several portions and dried in vacuo at 60–70° C. 72 parts of salt are obtained consisting parts of the monohydrate and partly of the anhydrous substance, M. P. 270–272° C., with frothing and blackening. The monohydrate has $(\alpha)_D^{20°} -25.5°$ (C=2% in 70% ethanol-water).

The combined mother liquors and washings are evaporated by heating under water pump vacuum until the residue has a creamy consistency. The mixture of solid and solution is then filtered, the filtered residue washed with 300 parts of water and finally crystallized from 800 parts of water. On cooling to 0° C. for several hours the solution deposits a further 70 parts of the strychnine d(−)-lactone sulphate. The yield is thus raised to ca. 88% of theory. This second crop of salt is sufficiently pure to be used as a source of the d(−)-lactone.

242 parts of the strychnine d(−)-lactone sulphate are heated with a mixture of 1200 parts of water and 180 parts of concentrated hydrochloric acid. The salt passes rapidly into solution and boiling under reflux is continued for 4 hours. At the end of this period the clear solution is cooled in ice and after 2 hours the crystalline strychnine hydrochloride removed by filtration. It is washed on the filter with 300 parts of ice-cold 2 N. hydrochloric acid and after drying in vacuum over sodium or potassium hydroxide is suitable for re-use in further resolutions. The combined mother liquors and washings from the strychnine hydrochloride are extracted with a rapid stream of benzene in a continuous type extractor for 24 hours. The extract is evaporated to dryness under water pump vacuum, the d(−)-α-hydroxy-β:β-dimethyl-γ-butyrolactone crystallizing in hard colorless lumps of crystals during this process. 54 parts of residue (95% of theory) are thus obtained and it is found that very little racemization has taken place during the hydrolysis, this product having $\alpha_D^{20} = -47.0°$ as compared with the value $$\alpha_D^{20} = -50.1°$$

for the pure substance. Complete purification is readily effected by dissolving this material in 80 parts of benzene, and stirring for a short time with 3 parts of adsorbent charcoal, filtering and adding 70 parts of petroleum ether (B. P. 40–60° C.) to the filtrate 45 parts of product crystallize out.

For recovery of the l(+)-α-hydroxy-β:β-dimethyl-γ-butyrolactone the following procedure is adopted. The combined filtrate from and washings of the crude second crop of strychnine d(−)-lactone sulphate are treated with about 20 parts of sodium hydroxide in solution, the precipitated strychnine base filtered off and the filtrate acidified by addition of 100 parts of concentrated hydrochloric acid. This acid solution is boiled under reflux for 5 hours, cooled and extracted continuously with benzene for 24 hours. The mixture of dl- and l(+)-α-hydroxy-β:β-dimethyl-γ-butyrolactones obtained by evaporation of the extract are dissolved in 100 parts of benzene and crystallization of the l(+)-isomer initiated by cautious addition of petroleum ether (B. P. 40–60°), about 50 parts being required. 35 parts of the l(+)-lactone are obtained.

*Example II*

130 parts of dl-α-hydroxy-β:β-dimethyl-γ-butyrolactone are dissolved in 300 parts of dry chloroform and the solution is mechanically stirred under anhydrous conditions. The stirred solution is cooled to 0° and 126 parts of chlorosulphonic acid added over a period of about half an hour. Large volumes of HCl gas are evolved and when the evolution slackens the reaction mixture is allowed to warm up to room temperature. The dl-lactone hydrogen sulphate usually separates in a crystalline mass. The reaction mixture is then shaken with 650 parts of water and the almost colorless aqueous layer separated. The yellow chloroform phase is again shaken with 200 parts of water. These aqueous extracts containing the dl-lactone hydrogen sulphate are combined, mechanically stirred and partially neutralized by the addition of 100 parts of sodium bicarbonate in small portions. The neutralization is completed and the solution pH brought to 6.5–7.0 by dropwise addition of approx. 2 N sodium hydroxide solution, about 80 parts being required. This neutralized solution is treated with strychnine hydrochloride solution, the crystallizing strychnine d(−)-lactone sulphate collected and the mother liquor worked up as described in Example I.

The yield of dried salt, however, is usually slightly better in the present example. The strychnine salt obtained may be decomposed and the d(−)-α-hydroxy-β:β-dimethyl-γ-butyrolactone isolated as in Example I.

Example III 130 parts of dl-α-hydroxy-β:β-dimethyl-γ-butyrolactone are dissolved in 200 parts of dry pyridine, the solution cooled and mechanically stirred. 126 parts of chlorsulphonic acid are then added dropwise, adjusting the speed of addition so that the reaction mixture has a temperature of 10–15° C. When the addition is completed the reaction mixture is allowed to warm up to room temperature and to remain so for 24 hours, during which period it solidifies.

The mass is dissolved by warming and stirring with 650 parts of water and the cooled solution brought to pH 6.5–7.0 by the slow addition of about 84 parts of sodium hydroxide dissolved in 600 parts of water. The solution is treated with strychnine hydrochloride solution the crystallizing strychnine d(−)-lactone sulphate collected and the mother liquors worked up as described in Example I.

The yield of the dried salt is only slightly less than in the process described in the previous examples. The strychnine salt obtained may be decomposed and the d(−)-α-hydroxy-β:β-dimethyl-γ-butyrolactone isolated exactly as detailed under Example I.

Example IV 130 parts of dl-α-hydroxy-β:β-dimethyl-γ-butyrolactone are dissolved in 200 parts of dry pyridine, the solution cooled and mechanically stirred. 126 parts of chlorsulphonic acid are then introduced dropwise, adjusting the speed of addition so that the reaction mixture has a temperature of 10–15° C. The reaction mixture is then allowed to stand at room temperature for 24 hours. The crystalline mass resulting from this procedure is dissolved by warming and stirring with 650 parts of water and after cooling the solution brought to pH 6.5–7.0 by slow addition of about 84 parts of sodium hydroxide dissolved in 600 parts of water. To this solution is added 215.3 parts of brucine hydrochloride dissolved in 1000 parts of hot water. On cooling the mixture to 0°− +5°C. crystallization of the brucine d(−)-lactone sulphate begins and is complete in about 48 hours. The crystalline salt is washed with 500 parts of water and dried in vacuo at 60–70° C. 92 parts of the salt, consisting largely of the monohydrate, are obtained in this manner. Much more may be separated from the mother liquors by procedures similar to that described in Example I.

d(−)-α-hydroxy-β:β-dimethyl-γ-butyrolactone may be obtained from the brucine salt by a procedure identical with the acid decomposition and hydrolysis described in Example I.

We claim:

1. A process for the resolution of dl-α-hydroxy-β:β-dimethyl-γ-butyrolactone which comprises treating dl-α-hydroxy-β:β-dimethyl-γ-butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate and a compound selected from the group consisting of strychnine-l(+)-α-hydroxy-β:β-dimethyl-γ-butyrolactone hydrogen sulphate and brucine-l(+)-α-hydroxy-β:β-dimethyl-γ-butyrolactone hydrogen sulphate, separating from said mixture by crystallization a compound selected from the group consisting of strychnine-d(−)-α-hydroxy-β:β-dimethyl-γ-butyrolactone hydrogen sulphate and brucine-d(−)-α-hydroxy -β:β- dimethyl-γ-butyrolactone hydrogen sulphate, and hydrolyzing the compound thus obtained to produce d(−)-α-hydroxy-β:β-dimethyl-γ-butyrolactone.

2. A process for the resolution of dl-α-hydroxy-β:β-dimethyl-γ-butyrolactone which comprises treating dl-α-hydroxy-β:β-dimethyl-γ-butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate and a compound selected from the group consisting of strychnine-l(+)-α-hydroxy-β:β-dimethyl-γ-butyrolactone hydrogen sulphate and brucine-l(+)-α-hydroxy-β:β-dimethyl-γ-butyrolactone hydrogen sulphate, separating from said mixture by crystallization a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate, and treating the compound thus obtained with a mineral acid to produce d(−)-α-hydroxy-β:β-dimethyl-γ-butyrolactone.

3. A process for the resolution of dl-α-hydroxy-β:β-dimethyl-γ-butyrolactone which comprises treating dl-α-hydroxy-β:β-dimethyl-γ-butyrolactone with chlorsulphonic acid in the presence of pyridine to produce the hydrogen sulphate of said lactone, reacting said hydrogen sulphate with an alkaloid selected from the group consisting of strychnine and brucine to form a mixture of a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate and a compound selected from the group consisting of strychnine-l(+)-α-hydroxy-β:β-dimethyl-γ-butyrolactone hydrogen sulphate and brucine-l(+)-α-hydroxy-β:β-dimethyl-γ-butyrolactone hydrogen sulphate, separating from said mixture by crystallization a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate, and hydrolyzing the compound thus obtained to produce d(−)-α-hydroxy-β:β-dimethyl-γ-butyrolactone.

4. A process for the resolution of dl-α-hydroxy-β:β-dimethyl-γ-butyrolactone which comprises treating dl-α-hydroxy-β:β-dimethyl-γ-butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(−)-α-hydroxy-β:β-dimethyl-γ-butyrolactone hydrogen sulphate and brucine-d(−)-α-hydroxy-β:β-dimethyl-γ-butyrolactone hydrogen sulphate and a compound selected from the group consisting of strychnine-l(+)-α-hydroxy-β:β-dimethyl-γ-butyrolactone hydrogen sulphate and brucine-l(+)-α-hydroxy-β:β-dimethyl-γ-butyrolactone hydrogen sulphate, separating from said mixture by crystallization a compound selected from the group consisting of strychnine-d(−)-α-hydroxy- β:β-dimethyl-γ-butyrolactone hydrogen sulphate and brucine-d(—)-α-hydroxy -β:β- dimethyl-γ-butyrolactone hydrogen sulphate, hydrolyzing the compound thus obtained to produce d(—)-α-hydroxy-β:β-dimethyl -γ- butyrolactone, and extracting the lactone by treatment with a solvent.

5. A process for the resolution of dl-alpha-hydroxy-beta:beta-dimethyl-gamma-butyrolactone which comprises treating dl-alpha-hydroxy-beta:beta-dimethyl-gamma-butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(—)-alpha-hydroxy - beta:beta-dimethyl - gamma-butyrolactone hydrogen sulphate and brucine-d-(—)-alpha - hydroxy-beta:beta-dimethyl-gamma - butyrolactone hydrogen sulphate and a compound selected from the group consisting of strychnine-1(+)-alpha-hydroxy-beta:beta-dimethyl- gamma - butyrolactone hydrogen sulphate and brucine-1(+)-alpha-hydroxy-beta:beta-dimethyl gamma butyrolactone hydrogen sulphate, and separating from said mixture by crystallization a compound selected from the group consisting of strychnine-d(—)-alpha-hydroxy-beta:beta- dimethyl - gamma-butyrolactone hydrogen sulphate and brucine-d(—)-alpha-hydroxy-beta:beta - dimethyl- gamma-butyrolactone hydrogen sulphate.

6. A process for the resolution of dl-alpha-hydroxy-beta:beta-dimethyl-gamma - butyrolactone which comprises treating dl-alpha-hydroxy-beta:beta-dimethyl-gamma - butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(—)-alpha-hydroxy-beta:beta-dimethyl - gamma - butyrolactone hydrogen sulphate and brucine-d(—)-alpha-hydroxy-beta:beta-dimethyl-gamma butyrolactone hydrogen sulphate and a compound selected from the group consisting of strychnine-1(+)-alpha-hydroxy-beta:beta-dimethyl-gamma - butyrolactone hydrogen sulphate and brucine-1(+)-alpha-hydroxy-beta:beta-dimethyl-gamma - butyrolactone hydrogen sulphate, separating from said mixture a compound selected from the group consisting of strychnine-d(—)-alpha-hydroxy-beta:beta-dimethyl-gamma - butyrolactone hydrogen sulphate and brucine-d(—) - alpha - hydroxy-beta:beta-diemthyl - gamma - butyrolactone hydrogen sulphate, and hydrolyzing the compound thus obtained to produce d(—)-alpha-hydroxy-beta:beta-dimethyl-gamma-butyrolactone.

7. A process for the resolution of dl-alpha-hydroxy-beta:beta-dimethyl-gamma - butyrolactone which comprises treating dl-alpha-hydroxy-beta:beta-dimethyl-gamma - butyrolactone with chlorsulphonic acid to produce the hydrogen sulphate of said lactone, reacting said hydrogen sulphate with an alkaloid selected from the group consisting of strychnine and brucine to form a mixture of a compound selected from the group consisting of strychnine-d(—)-alpha-hydroxy-beta:beta-dimethyl - gamma - butyrolactone hydrogen sulphate and brucine-d(—)-alpha-hydroxy- beta:beta - dimethyl - gamma - butyrolactone hydrogen sulphate and a compound selected from the group consisting of strychnine-1(+)-alpha-hydroxy-beta:beta- dimethyl - gamma-butyrolactone hydrogen sulphate and brucine-1(+)-alpha-hydroxy - beta:beta - dimethyl-gamma-butyrolactone hydrogen sulphate, and separating from said mixture a compound selected from the group consisting of strychnine-d(—)-alpha-hydroxy-beta:beta-dimethyl - gamma-butyrolactone hydrogen sulphate and brucine-d(—)-alpha-hydroxy-beta:beta-dimethyl - gamma-butyrolactone hydrogen sulphate.

8. A process for the resolution of dl-alpha-hydroxy-beta:beta - dimethyl - gamma - butyrolactone, which comprises treating dl-alpha-hydroxybeta:beta-dimethyl-gamma - butyrolactone with chlorsulphonic acid to produce the hydrogen sulphate of said lactone, separating the d(—) and 1(+) forms of said hydrogen sulphate in the form of their salts with an alkaloid selected from the group consisting of strychnine and brucine, and hydrolyzing the d(—)-alpha-hydroxy-beta:beta-dimethyl-gamma-butyrolactone from said alkaloid salt.

9. The process of claim 8 in which the alkaloid is employed in the form of its mineral acid salt.

10. The process of claim 8 in which the alkaloid is employed in the form of its hydrochloride.

11. The process of claim 8 in which one-half mol of the alkaloid is employed per mol of the lactone.

FRANZ BERGEL.
AARON COHEN.
ALEXANDER LANG MORRISON.
ALBERT RONALD MOSS.

REFERENCES CITED

The following references are of record in the file of this patent:

UNITED STATES PATENTS

| Number | Name | Date |
|---|---|---|
| 2,319,545 | Harris et al. | May 18, 1943 |
| 2,328,000 | Finkelstein | Aug. 31, 1943 |
| 2,390,281 | Tishler | Dec. 4, 1945 |

OTHER REFERENCES

Major et al., Jr. American Chemical Soc., vol. 63 (May 1941), pages 1368 to 1371.

Stiller et al., Jr. Amer. Chem. Soc., vol. 62 (July 1940), pages 1785 to 1790.

Certificate of Correction

Patent No. 2,423,062.   June 24, 1947.

FRANZ BERGEL ET AL.

It is hereby certified that errors appear in the printed specification of the above numbered patent requiring correction as follows: Column 1, line 14, for "Asta" read *Acta*; line 28, for "alkaloid" read *alkaloidal*; column 3, line 18, Example I, for "di-" read *dl-*; column 5, line 22, Example III, for "process" read *processes*; column 8, line 25, claim 8, for "droxybeta" read *droxy-beta*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*